United States Patent
Kojori et al.

(10) Patent No.: US 8,350,573 B2
(45) Date of Patent: *Jan. 8, 2013

(54) METHOD AND APPARATUS FOR GENERALIZED AC AND DC ARC FAULT DETECTION AND PROTECTION

(75) Inventors: Hassan Ali Kojori, Mississauga (CA); Yang Ye, Mississauga (CA)

(73) Assignee: Honeywell International Inc., Morristown, NJ (US)

( * ) Notice: Subject to any disclaimer, the term of this patent is extended or adjusted under 35 U.S.C. 154(b) by 292 days.

This patent is subject to a terminal disclaimer.

(21) Appl. No.: 12/890,861

(22) Filed: Sep. 27, 2010

(65) Prior Publication Data

US 2011/0012607 A1      Jan. 20, 2011

Related U.S. Application Data

(62) Division of application No. 11/859,677, filed on Sep. 21, 2007, now Pat. No. 7,834,637.

(51) Int. Cl.
    G01R 31/08     (2006.01)
    H02H 3/00      (2006.01)
(52) U.S. Cl. .......................................... 324/523; 361/42
(58) Field of Classification Search ............ 324/523
    See application file for complete search history.

(56) References Cited

U.S. PATENT DOCUMENTS

| | | |
|---|---|---|
| 5,047,724 A | 9/1991 | Boksiner et al. |
| 5,991,327 A | 11/1999 | Kojori |
| 6,242,922 B1 | 6/2001 | Daum et al. |
| 6,433,978 B1 | 8/2002 | Neiger et al. |
| 6,504,692 B1 | 1/2003 | Macbeth et al. |
| 6,625,550 B1 | 9/2003 | Scott et al. |

(Continued)

FOREIGN PATENT DOCUMENTS

EP      0 350 829 A2     1/1990

OTHER PUBLICATIONS

Momoh J. A. et al, "Design and Analysis of Aerospace DC Arcing Faults Using Fast Fourier Transformation and Artificial Neural Network", 2003 IEEE Power Engineering Society General Meeting. Conference proceedings, Toronto Ontario, Canada, Jul. 13-17, 2003 [IEEE Power Engineering Society, New York, NY: IEEE, US].

*Primary Examiner* — Jeff Natalini
(74) *Attorney, Agent, or Firm* — Shimokaji & Assoc., PC (57) ABSTRACT

According to the features discussed herein, through a single generalized arc-fault detection algorithm, various types of series and/or parallel arc faults can be detected without any nuisance trip for either AC or DC Electric Power Systems. Running Discrete Fourier Series (RDFS) formulation for nuisance-free operation and cost-effective implementation is developed. Unlike other methods which require numerous source and load-side current and voltage measurements, only source side current is required. An arc detector may include a first detector to monitor variations of a magnitude of a fundamental component of a current, and a second detector to monitor an overload condition based in an $i^2t$ calculation. A method may include obtaining a first cycle of a fundamental component of a current, obtaining a second cycle of the fundamental component of the current, and comparing the first cycle of the fundamental component of the current and the second cycle of the fundamental component of the current to determine if a difference of the first cycle and the second cycle is greater than a threshold amount.

4 Claims, 13 Drawing Sheets

U.S. PATENT DOCUMENTS

| | | |
|---|---|---|
| 7,007,179 B2 | 2/2006 | Mares |
| 7,038,897 B2 | 5/2006 | Csanky |
| 7,177,125 B2 | 2/2007 | Lazarovich et al. |
| 7,190,562 B2 | 3/2007 | Pellon et al. |
| 7,292,045 B2 * | 11/2007 | Anwar et al. ............. 324/536 |
| 2006/0042846 A1 | 3/2006 | Kojori et al. |
| 2006/0087782 A1 | 4/2006 | Michalko et al. |
| 2006/0101296 A1 | 5/2006 | Mares et al. |
| 2006/0137251 A1 * | 6/2006 | Imai et al. ................. 49/360 |
| 2006/0200688 A1 | 9/2006 | Tofigh et al. |
| 2006/0203401 A1 | 9/2006 | Kojori et al. |
| 2006/0215335 A1 | 9/2006 | Deshpande |
| 2007/0103833 A1 | 5/2007 | Harris, IV |
| 2008/0151451 A1 * | 6/2008 | Kilroy et al. ................ 361/86 |

\* cited by examiner

METHOD AND APPARATUS FOR GENERALIZED AC AND DC ARC FAULT DETECTION AND PROTECTION

CROSS REFERENCE TO RELATED APPLICATION

This application is a divisional of U.S. application Ser. No. 11/859,677 filed Sep. 21, 2007.

BACKGROUND OF THE INVENTION

The present invention relates generally to arc fault detection and protection and, more particularly, to generalized AC and DC arc fault detection and protection.

Arc faults may occur in electrical systems in many different environments, including aircraft, buildings, and sea craft. Arc faults are a significant cause of numerous fires each year. These fires may lead to serious property damage and even loss of life.

Numerous arc fault detection and protection methods and apparatus have been developed in an attempt to reduce or eliminate arc faults. However, these arc fault detection and protection methods and apparatus have shortcomings. For example, many detection and protection methods and apparatus are particular to particular types of arc faults. For example, a detection and protection method and apparatus may only detect AC parallel arc faults. Such a detection and protection method and apparatus may not detect an AC series arc, a DC parallel arc, or a DC series arc. Further, those detection and protection methods and apparatus that may be capable of detecting multiple types of arc faults may require extensive hardware and complex calculations.

As can be seen, there is a need for arc fault detection and protection methods and apparatus capable of detecting many different types of arc faults. There is also a need for arc fault detection and protection methods and apparatus utilizing relatively simple calculations.

SUMMARY OF THE INVENTION

In one aspect of the present invention, an arc detector may include a first detector to monitor variations of a magnitude of a fundamental component of a current, and a second detector to monitor an overload condition based on an $i^2t$ calculation.

In another aspect of the present invention, an electric power distribution system may include a power source, a first load wire connected to the power source, a first load wire distribution circuit breaker connected to the first load wire, a current sensor output, a voltage sensor output, and an arc fault detector to receive a current from the current sensor output, to receive a voltage from the voltage sensor output, and to output a trip signal to the first load wire distribution circuit breaker in the event of an arc fault.

In another aspect of the present invention, a method may include obtaining a first cycle of a fundamental component of a current, obtaining a second cycle of the fundamental component of the current, and comparing the first cycle of the fundamental component of the current and the second cycle of the fundamental component of the current to determine if a difference of the first cycle and the second cycle is greater than a threshold amount.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
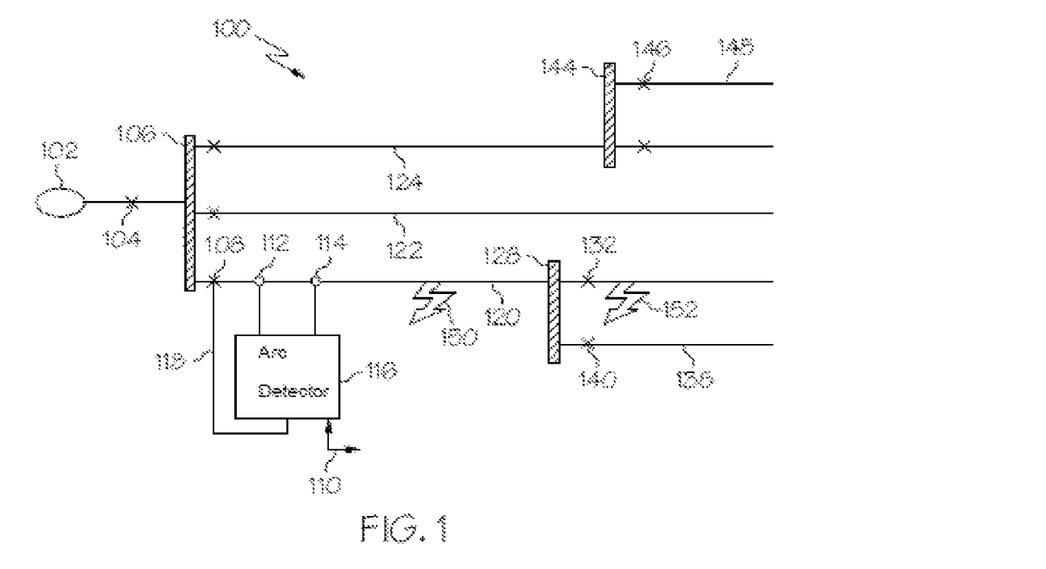
FIG. 1 is a schematic representation of an electric power distribution system for generalized AC and DC arc fault detection and protection according to an exemplary embodiment of the invention.

FIG. 1 is a schematic representation of an electric power distribution system 100 for generalized AC and DC arc fault detection and protection according to an exemplary embodiment of the invention. The electric power distribution system 100 may include a power source 102 (direct current (DC) or alternating current (AC)), a primary distribution circuit breaker 104, a first bus-bar 106, an initial first load wire distribution circuit breaker 108, a bidirectional data exchange link 110, a current sensor output 112, a voltage sensor output 114, an arc fault detector 116, and a first load wire 120. The power source 102 may be a primary power source (for example, a 115 volt AC or 230 volt AC power supply) or a secondary power source (for example a 28 volt power supply). The electric power distribution system 100 may further include a second bus-bar 128, a secondary first load wire distribution circuit breaker 132, a fourth load wire 138, and a fourth load wire distribution circuit breaker 140. The electric power distribution system 100 may further include a second load wire 122, a third load wire 124, a third bus-bar 144, a fifth load wire distribution circuit breaker 146, and a fifth load wire 148.

The power source 102 may be connected to a primary distribution circuit breaker 104 and a first bus-bar 106. The first bus-bar 106 may be attached to a first load wire 120, a second load wire 122, and a third load wire 124. The first load wire 120 may be attached to an initial first load wire distribution circuit breaker 108, a current sensor output 112, and a voltage sensor output 114.

According to the features discussed herein, a variety of arc types may be detected and protected against. By way of example and not by way of limitation, AC parallel arcs, AC series arcs, DC parallel arcs, and DC series arcs may be detected.

The arc fault detector 116 may protect particular load wires at particular locations in the event of an arc (i.e., provide arc fault detection and selective protection for a corresponding zone). For example, the arc fault detector 116 may disable the first load wire 120 at the initial first load wire distribution circuit breaker 108 if there is an arc at, for example, a first arc fault location 150. The arc fault detector 116 may communicate a trip signal 118 to the initial first load wire distribution circuit breaker 108. The initial first load wire distribution circuit breaker 108 may open thus disabling that portion of the first load wire 120.

A trip signal (or other on/off indication or control) may alternatively be communicated to another central command/control unit such as a bus power control unit as described in U.S. Patent Publication No. 2006/0042846, which is incorporated herein by reference.

Current (i) may be supplied to the arc fault detector 116 from the current sensor output 112. Voltage (v) may be supplied to the arc fault detector 116 from the voltage sensor output 114. The arc fault detector 116 may be a standalone distributed unit or integrated into a panel for many such units (i.e., an electric load management center) as described in U.S. Patent Publication No. 2003/0095367, which is incorporated herein by reference.

The bidirectional data exchange link 110 may communicate information, such as parameters of interest (current i, voltage v, temperature, fundamental frequency f, etc.) to a prognostic health monitoring system as described in U.S. Patent Publication No. 2003/0204777, which is incorporated herein by reference.

Figure 2:
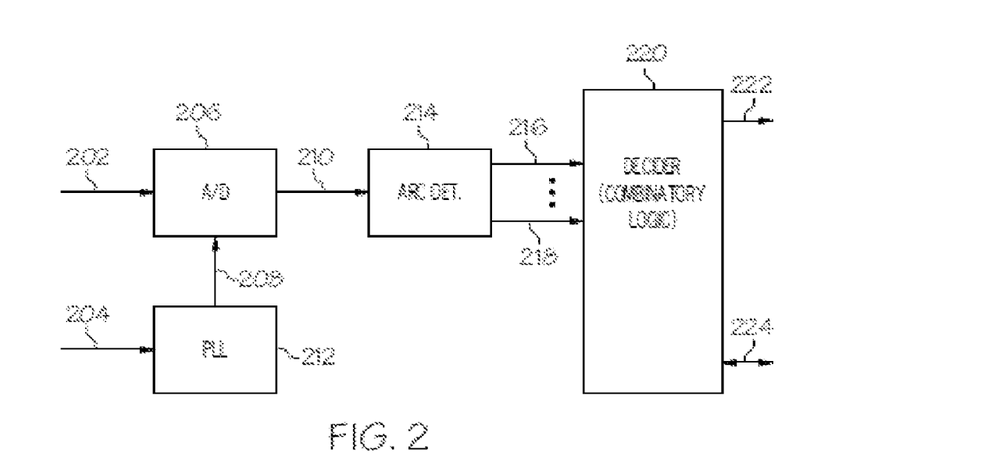
FIG. 2 is a block diagram of an arc fault detector, such as the arc fault detector of FIG. 1, according to an exemplary embodiment of the present invention.

FIG. 2 is a block diagram of an arc fault detector 200, such as the arc fault detector 116 of FIG. 1, according to an exemplary embodiment of the present invention. The arc fault detector 200 may include an analog/digital (A/D) converter 206, a phase lock loop (PLL) 212, an arc detector 214, and a decider 220.

A current (i) signal 202 may be supplied to the A/D converter 206. The A/D converter 206 may sample the current (i) signal 202 into a sampled current (i*) signal 210. In an exemplary AC embodiment, a sampling frequency of 20 kHz for 400 Hz and 40 kHz for 800 Hz may be used. The PLL 212 may receive the voltage signal 204. The PLL 212 may determine AC system fundamental frequency ($f_0$) for voltage signal 204, and may generate a sampling pulse 208

$$T_s = \frac{1}{Nf_0}$$

wherein Ts is the sampling pulse for the A/D converter 206, $f_0$ is the fundamental frequency, and N is an integer, ensuring that the sampling frequency may be an integer multiple of the fundamental frequency. In some systems, the AC system voltage signal may be used by the PLL.

The arc detector 214 may use the sampled current (i*) signal 210 to determine the status of multiple detector flags. The detector flags may be output (detector 1 output 216, detector N output 218) to the decider 220. The decider 220 may, in a combinatory logic manner, decide if an arc condition exists based on received detector flags. The decider may output an on/off signal 222, such as the trip signal 118 of FIG. 1. The decider may output a prognostic health monitoring system signal 224.

For a DC system, there may be no need for the arc fault detector PLL 212. A fixed predetermined frequency may be used for a Running Discrete Fourier Series (RDFS) calculation. For example, a fixed fundamental frequency of 2-4 kHz may be used.

Figure 3:
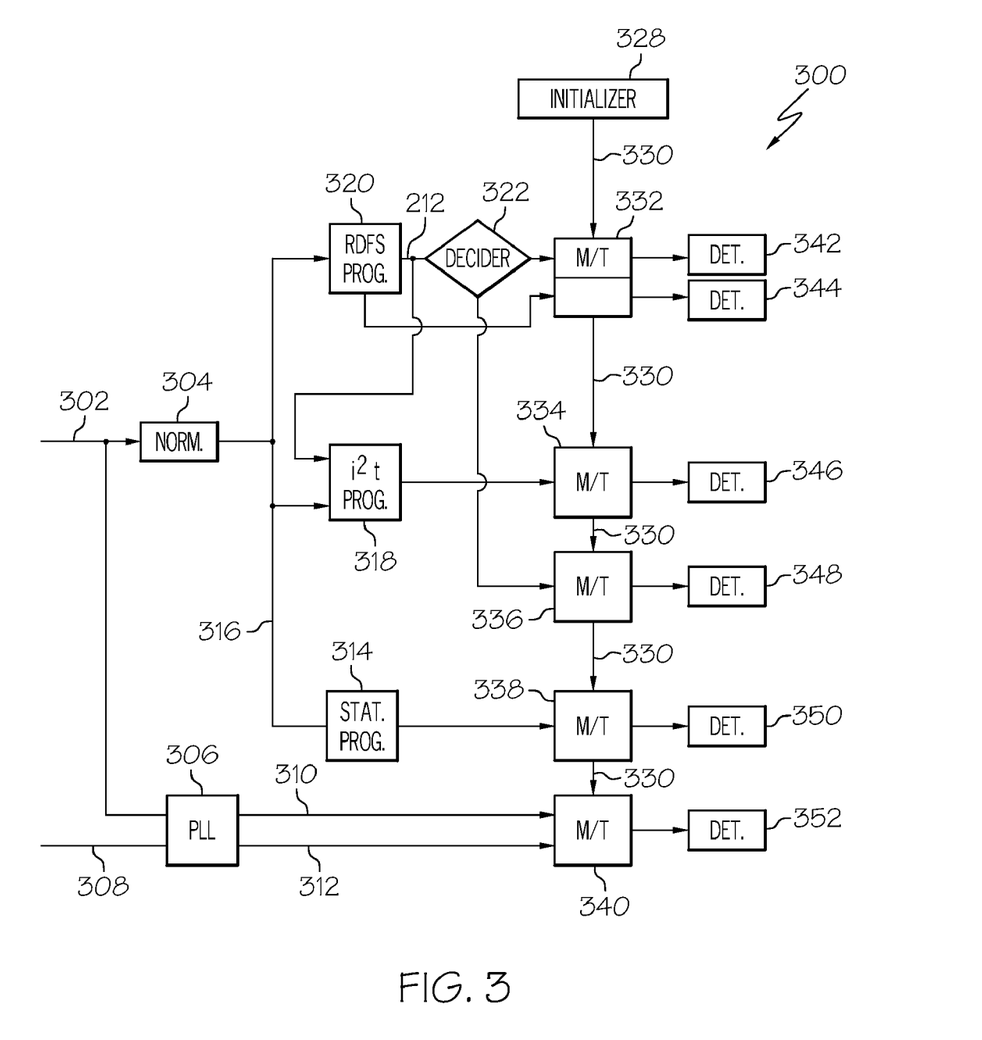
FIG. 3 is a block diagram of an arc detector, such as the arc detector of FIG. 2, according to an exemplary embodiment of the present invention.

FIG. 3 is a block diagram of an arc detector 300, such as the arc detector 214 of FIG. 2, according to an exemplary embodiment of the present invention. The arc detector 300 may include a normalizer 304, an arc detector PLL 306, a statistical processor 314, an $i^2t$ processor 318, and an RDFS processor 320. The arc detector 300 may further include a decider 322, an initializer 328, a first monitor/tracker 332, a second monitor/tracker 334, a third monitor/tracker 336, a fourth monitor/tracker 338, and a fifth monitor/tracker 340. The arc detector 300 may further include a first detector 342, an optional additional first detector 344 that may monitor a variation of higher order harmonics, a second detector 346, a third detector 348, a fourth detector 350, and a fifth detector 352.

Sampled current (i*) 302 may be supplied to the normalizer 304. A solid state power controller (SSPC) or circuit breaker current rating ($I_R$) may be used to obtain a normalized (per unit) current $\bar{i}^*$ 316. The RDFS processor 320 may use normalized current $\bar{i}^*$ samples to determine a fundamental component $\bar{i}_1^*$ of line current. The fundamental component $\bar{i}_1^*$ of line current may be obtained in a real-time manner. RDFS formulation may be used to represent the line current by its DC component, fundamental component, and higher-order components. The first detector 342 and the third detector 348 may use the fundamental component of the current to, using the first monitor/tracker 332 and the third monitor/tracker 336, track and monitor variations of the current's magnitude for detecting an arc. The first monitor/tracker 332 may be used when the fundamental component $\bar{i}_1^*$ is greater than or equal to 1 p.u. (per unit). The third monitor/tracker 336 may be used when the fundamental component $\bar{i}_1^*$ is less than 1 p.u. The first monitor/tracker 332 and first detector 342, and the third monitor/tracker 336 and third detector 348 may be used in an exclusive or logic condition.

The statistical processor 314 may use high order statistics in conjunction with comb filters and RDFS. The use of high order statistics is described in U.S. Patent Publication No. 2006/0203401, which is incorporated herein by reference. Thus, the statistical processor 314 and its information may, as discussed below, be used as a fourth monitor/tracker 338, and fourth detector 350. Reference character 330 may represent an exemplary order of processing of the detectors.

The RDFS processor 320 may use a RDFS formulation to derive DC fundamental and high-order harmonic content of the line current and line voltage through software algorithm. This may eliminate notch filters which may be prone to noise, drift, offset, and performance degradation due to aging or environmental conditions, such as vibration.

RDFS formulation may be represented mathematically. An arbitrary waveform f(ωt) may be described by the Fourier series:

$$f(t) = a_0 + \sum_{n=1}^{\infty} a_n \sin(n\omega t) + \sum_{n=1}^{\infty} b_n \cos(n\omega t)$$

$$a_0 = \frac{1}{2\pi} \int_0^{2\pi} f(\omega t) d(\omega t)$$

$$a_n = \frac{1}{\pi} \int_0^{2\pi} f(\omega t) \sin(n\omega t) d(\omega t)$$

$$b_n = \frac{1}{\pi} \int_0^{2\omega} f(\omega t) \cos(n\omega t) d(\omega t)$$

Using the above equations and trapezoidal numerical integration, one may show that:

$$a_0 = \frac{1}{2(N-1)}\left[\left(2\sum_{i=1}^{N} f_i\right) - f_1 - f_N\right]$$

$$a_n = \frac{1}{N-1}\left[2\sum_{i=1}^{N} f_{ai} - f_{a1} - f_{aN}\right]$$

$$b_n = \frac{1}{N-1}\left[2\sum_{i=1}^{N} f_{bi} - f_{b1} - f_{bN}\right]$$

where N represents the number of sampled points, $f_i$ represents the sampled waveform, $f_{ai}{}^n = f_i * \sin[2\pi/(N-1)*(i-1)]$ i=1 ... N, and $f_{bi}{}^n = f_i * \cos[2\pi/(N-1)*(i-1)]$ i=1 ... N. The magnitude of the $n^{th}$ harmonic and its angle $\phi_n$ may be given by:

$$c_n = [a_n^2 + b_n^2]^{\frac{1}{2}}$$

$$\phi_n = \tan^{-1}\left[\frac{b_n}{a_n}\right]$$

In order to minimize the discretization error associated with RDFS, the sampling time Ts may equal $$\frac{1}{Nf_0},$$

and Ts may be an integer multiple of the fundamental period $f_0$. The arc fault detector PLL 212 determining f0, and $$Ts = \frac{1}{Nf_0}$$

recalculation at every sampling point may ensure this criteria.

The $i^2t$ processor 318 may use an $i^2t$ calculation for overload protection. The $i^2t$ processor 318 may be used with the second detector 346 and in conjunction with the first and third detectors 342 and 348. Methods relating to an $i^2t$ overload condition are described in U.S. Patent Publication No. 2007/0014066, which is incorporated herein by reference. $i^2t$ detection may be implemented on an actual current waveform or the fundamental current $\bar{i}_1*$. Implementing $i^2t$ detection on the fundamental current $\bar{i}_1*$ may eliminate sensitivity to high order harmonics.

The arc detector PLL 306 may receive the AC line current information and determine the fundamental period $T_0$ and $T_s$ that may be required for proper operation of an A/D converter, such as the A/D converter 206 of FIG. 2. In the event of an arc, the arc detector PLL 306 may not function properly and thus by itself may be incorporated as a detector which may raise a red flag. Additionally, AC line voltage may be used for PLL and $T_0{}^1$ (fundamental frequency derived from voltage) may be obtained. $T_0{}^1$ should correspond with the fundamental period calculation from the current waveform. If there is a significant discrepancy, it may be tracked and monitored by the fifth monitor/tracker 340 and the fifth detector 352 may be activated. Digital PLL for VF systems and method for achieving synchronized samples are described in U.S. Pat. No. 6,850,426, which is incorporated herein by reference. In an exemplary AC embodiment, each arc fault detection channel may not require a separate PLL. A single PLL may be used for multiple or all of the channels in an ELMC or the fundamental frequency may be externally communicated for each channel.

As noted above, the statistical processor 314 may use high order statistics in conjunction with comb filters and RDFS. Methods similar to those discussed in conjunction with FIGS. 5A-C as discussed below may be used for tracking and monitoring kurtosis to reduce or eliminate nuisance trip conditions, as required where such problems may arise due to certain applications.

Additional types of detectors, such as detectors based on synthesis of line current, voltage, active/reactive power flow, and differential protection (current/voltage), may be used and are considered to be within the scope of the invention. By way of example and not by way of limitation, these detectors may include ground fault current, unbalanced system condition, excessive high order harmonics detected by RDFS, excessive out of range conditions for selected temperatures, etc. Further, it should be noted that less or more than the detectors shown may be used, as required.

Figure 4:
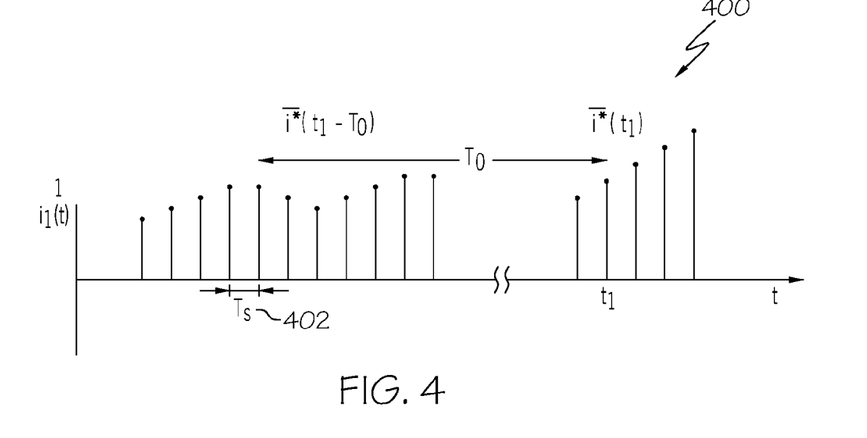
FIG. 4 is a schematic representation of fundamental components of normalized and synchronized current sampled data points of a current waveform according to an exemplary embodiment of the present invention.

FIG. 4 is a schematic representation of fundamental components of normalized and synchronized current sampled data points 400 of a current waveform according to an exemplary embodiment of the present invention. If a current waveform is sampled in time, a discrete function may be obtained. The interval between the discrete magnitudes may be a sampling time $T_S$ 402.

Figure 5A:
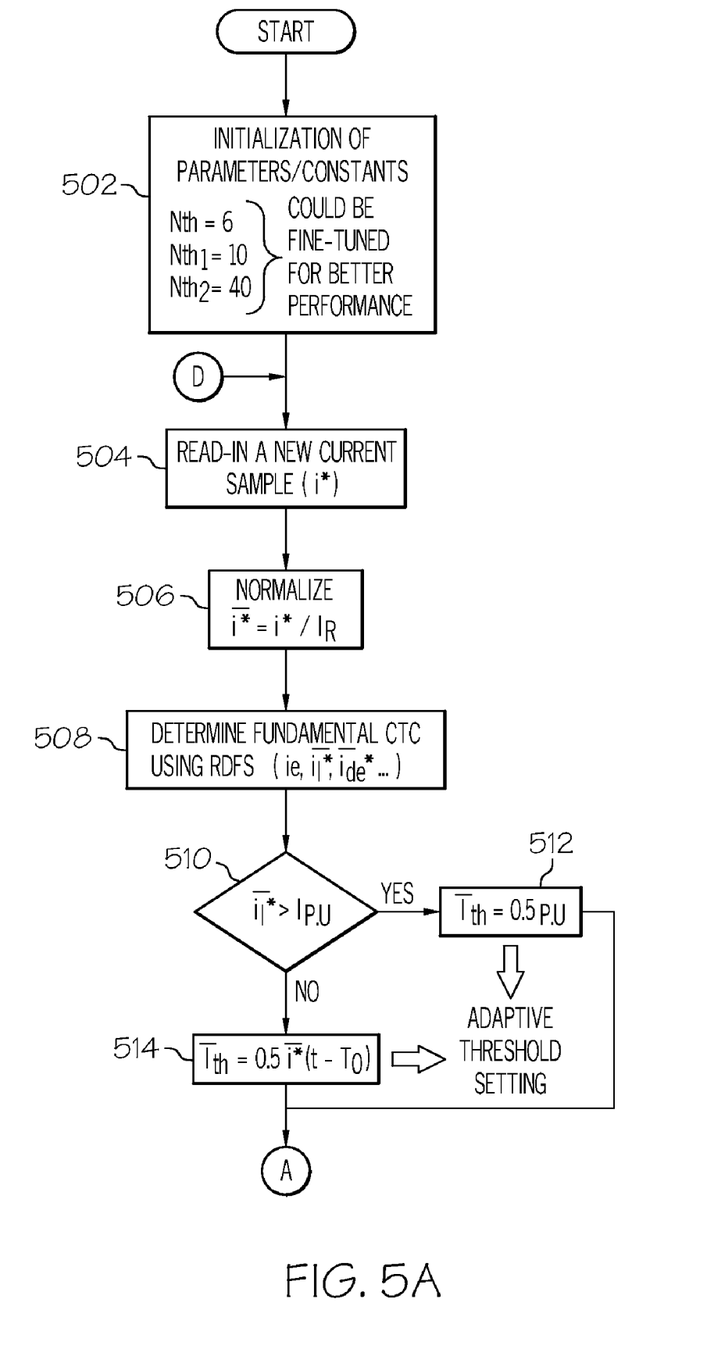
FIGS. 5A-C is a flowchart of a process of generalized AC and DC arc fault detection and protection according to an exemplary embodiment of the present invention.
Figure 5B:
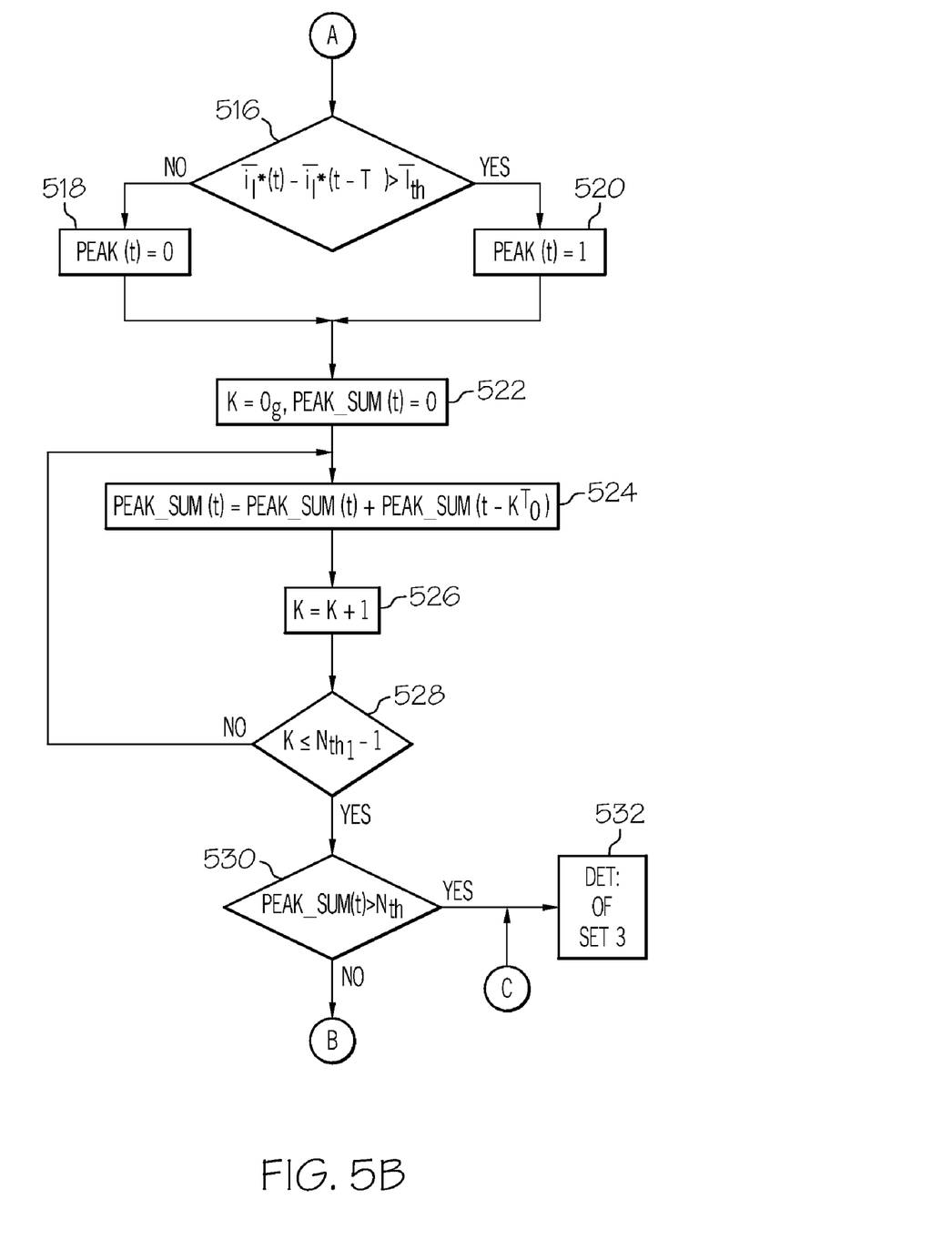
Figure 5C:
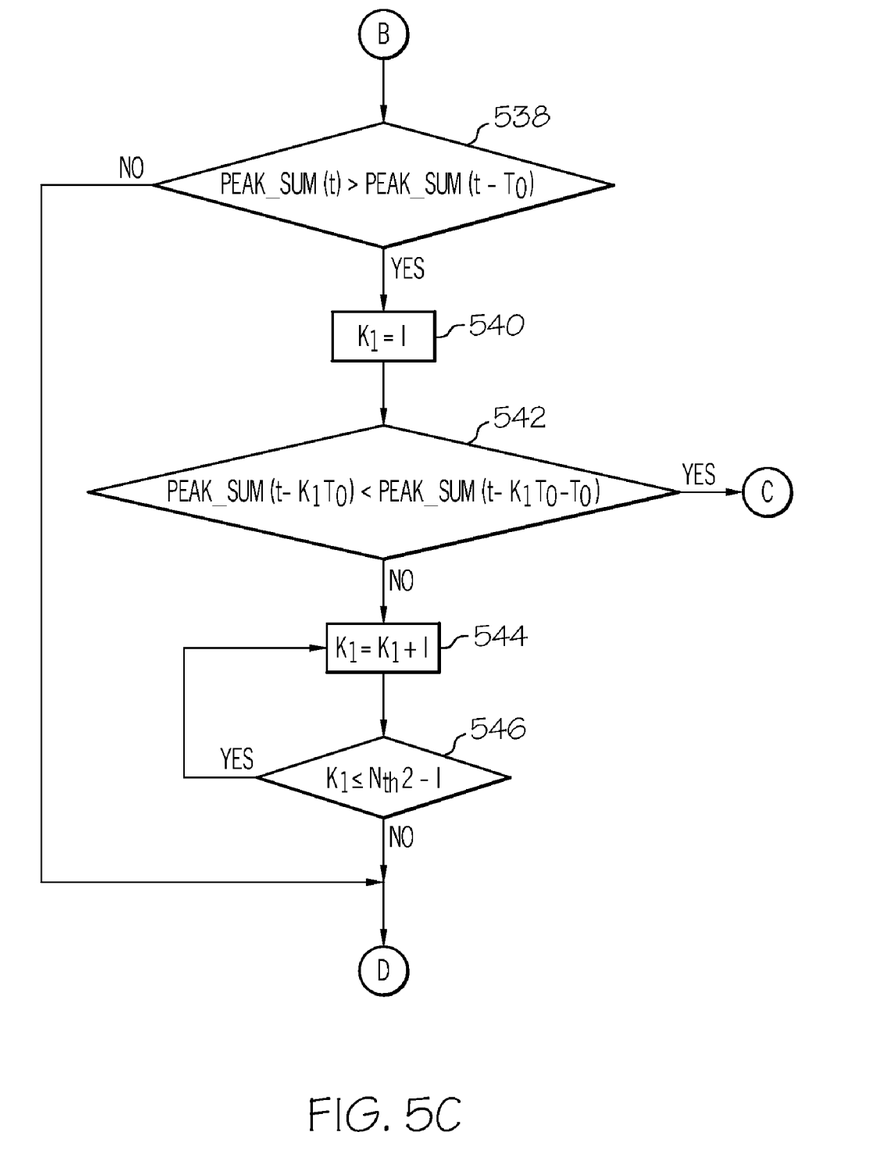

FIGS. 5A-C is a flowchart of a process of generalized AC and DC arc fault detection and protection 500 according to an exemplary embodiment of the present invention. In operation 502 parameters may be initialized. The parameters may be initialized by an initializer, such as the initializer 328 of FIG. 3. In operation 504, a new current sample may be read in. In operation 506, the current sample may be normalized. The current sample may be normalized by a normalizer, such as the normalizer 304 of FIG. 3. After normalization, the current sample may be sent to various detection arms. In operation 508, current information including a fundamental component may be determined. Current information may be determined by an RDFS processor, such as the RDFS processor 320 of FIG. 3. In operation 510, it may be determined if the fundamental component is greater than or equal to a particular value; for example, 1 p.u. or less than 1 p.u. The determination may be made by a decider, such as the decider 322 of FIG. 3. If the fundamental component is greater than the particular value, then the signal may go to a first monitor/tracker 512, such as the first monitor/tracker 332 of FIG. 3. If the fundamental component is less than the particular value, then the signal may go to a different monitor/tracker 514, such as third monitor/tracker 336 of FIG. 3. Thereafter, the signal may go to a first detector, such as the first detector 342 of FIG. 3, or another detector, such as the third detector 348 of FIG. 3. Both detectors are represented in FIG. 5 as element A.

The operation of a detector (element A) may begin with, for example, two cycles of a fundamental component of a current being checked in operation 516 for differences. If the difference of the two cycles is above a threshold amount, then the subject cycle may be marked as Peak(t)=1 in operation 520. Otherwise, the cycle may be marked as Peak(t)=0 in operation 518. These operations may be repeated for a number of cycles. In operation 522, a counter K and a peak counter Peak_Sum(t) may be set to zero. In operations 524, 526, and 528, these repeated cycles may be counted by the counter K, and the number of peaks may be summed Peak_Sum(t). If, in operation 530, Peak_Sum(t) is determined to exceed a certain number, then an arc may be occurring and the process may continue to element C. Otherwise, the process may continue to element B.

In element B, the objective may be to check the current magnitude variation in more detail. In operation 538, the number of peaks of the present cycle Peak_Sum(t) may be compared with that of the previous cycle Peak_Sum(t−T0). If it is not bigger than the previous cycle, then no arc may be detected for this cycle. The process may go to element D in FIG. 5-A. If it is bigger than the previous cycle, then the process may go to operations 540, 542, 544, and 546. The idea of these operations is to check in the previous given number of cycle (the given number is set in Nth2), in every successive pair of cycles, if the number of peaks of the latter cycle is always bigger or equal to that of the former cycle, then no arc may be detected; otherwise, if in any successive pair of cycles, the number of peaks of the latter cycle is smaller than that of the former cycle, an arc may be detected.

Figure 6:
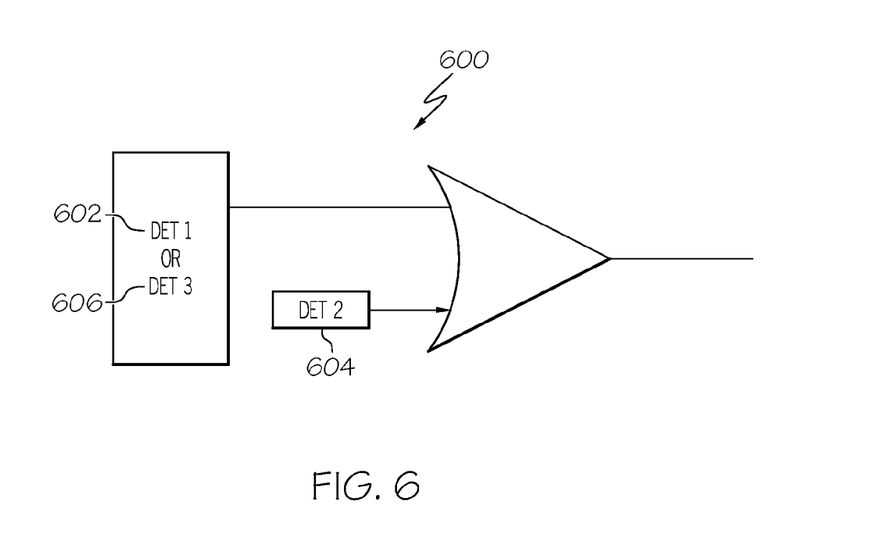
FIG. 6 is a schematic representation of combinatory logic, such as the combinatory logic of the decider of FIG. 2, according to an embodiment of the present invention.

FIG. 6 is a schematic representation of combinatory logic 600, such as the combinatory logic of the decider 220 of FIG. 2, according to an embodiment of the present invention. DET 1 and DET 3 may correspond to fundamental current peak variation detection. DET 2 may correspond to i²*t detection. DET 1 or DET 3 may be used in combination with DET 2.

Figure 7A:
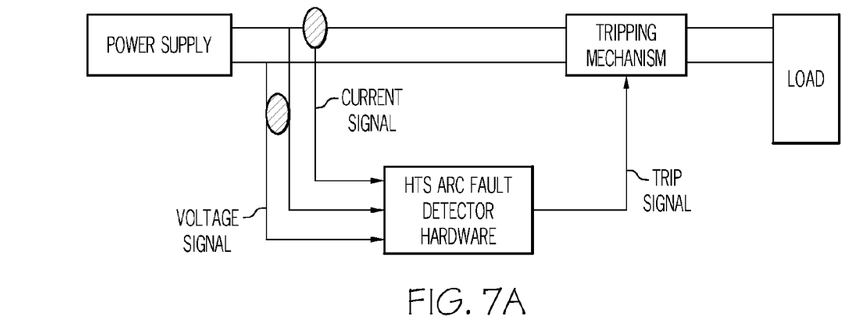
FIG. 7 is a schematic representation of an arc fault detector test setup according to an exemplary embodiment of the present invention.
Figure 7B:
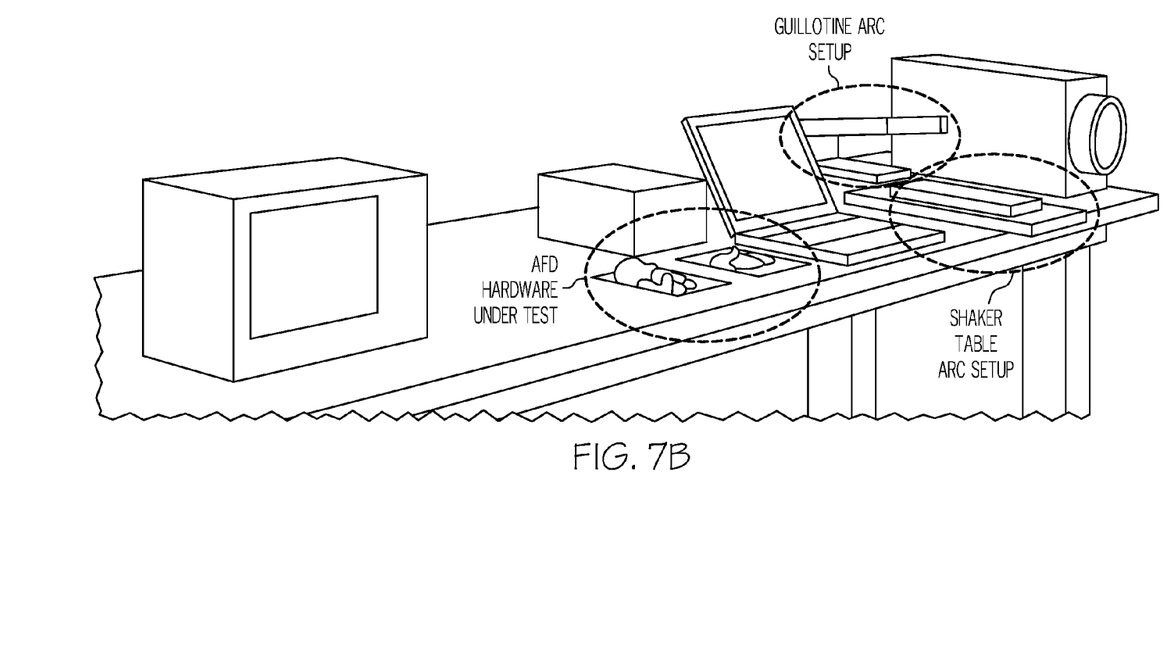
Figure 8A:
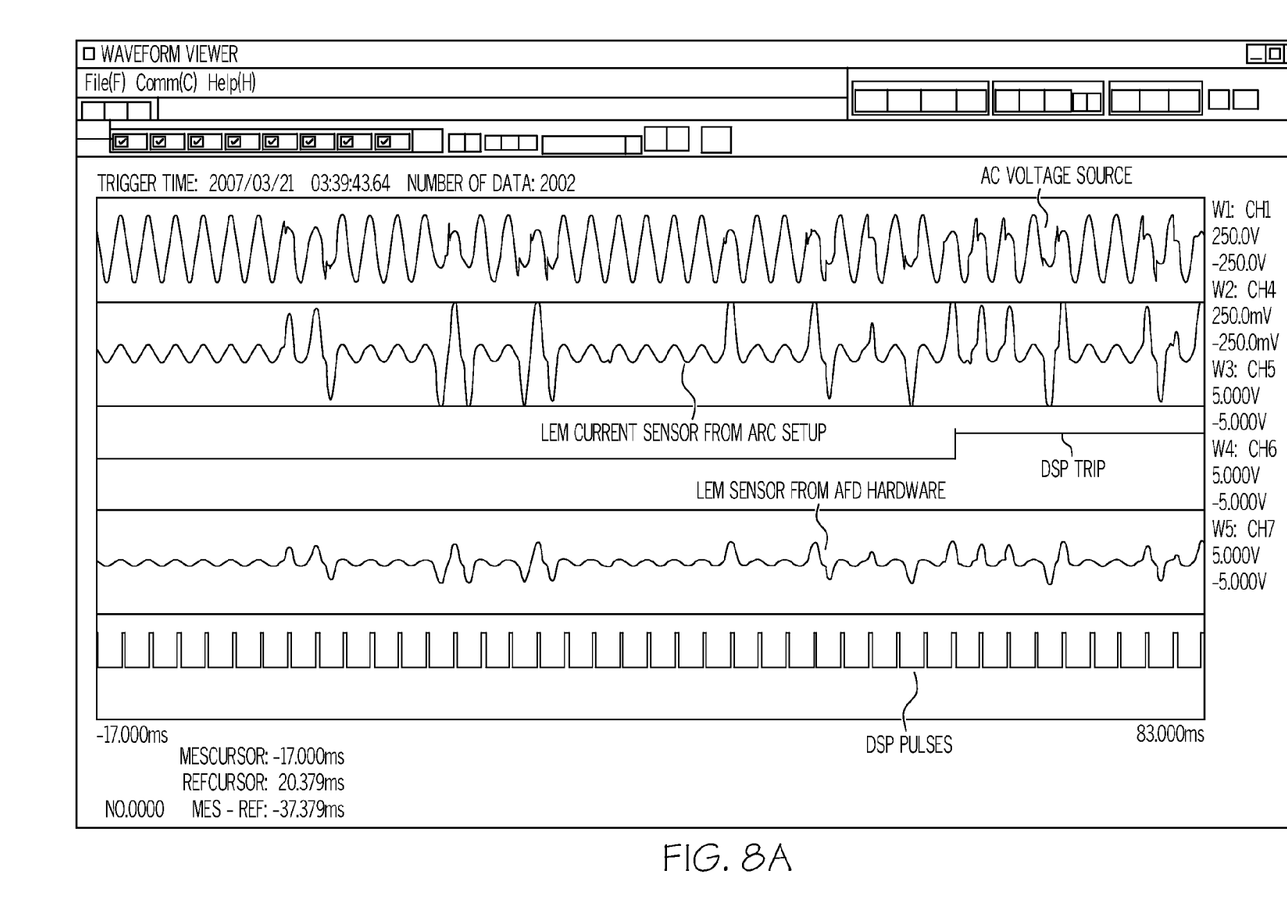
FIGS. 8A-F are schematic representations of exemplary test results according to an exemplary embodiment of the present invention.
Figure 8B:
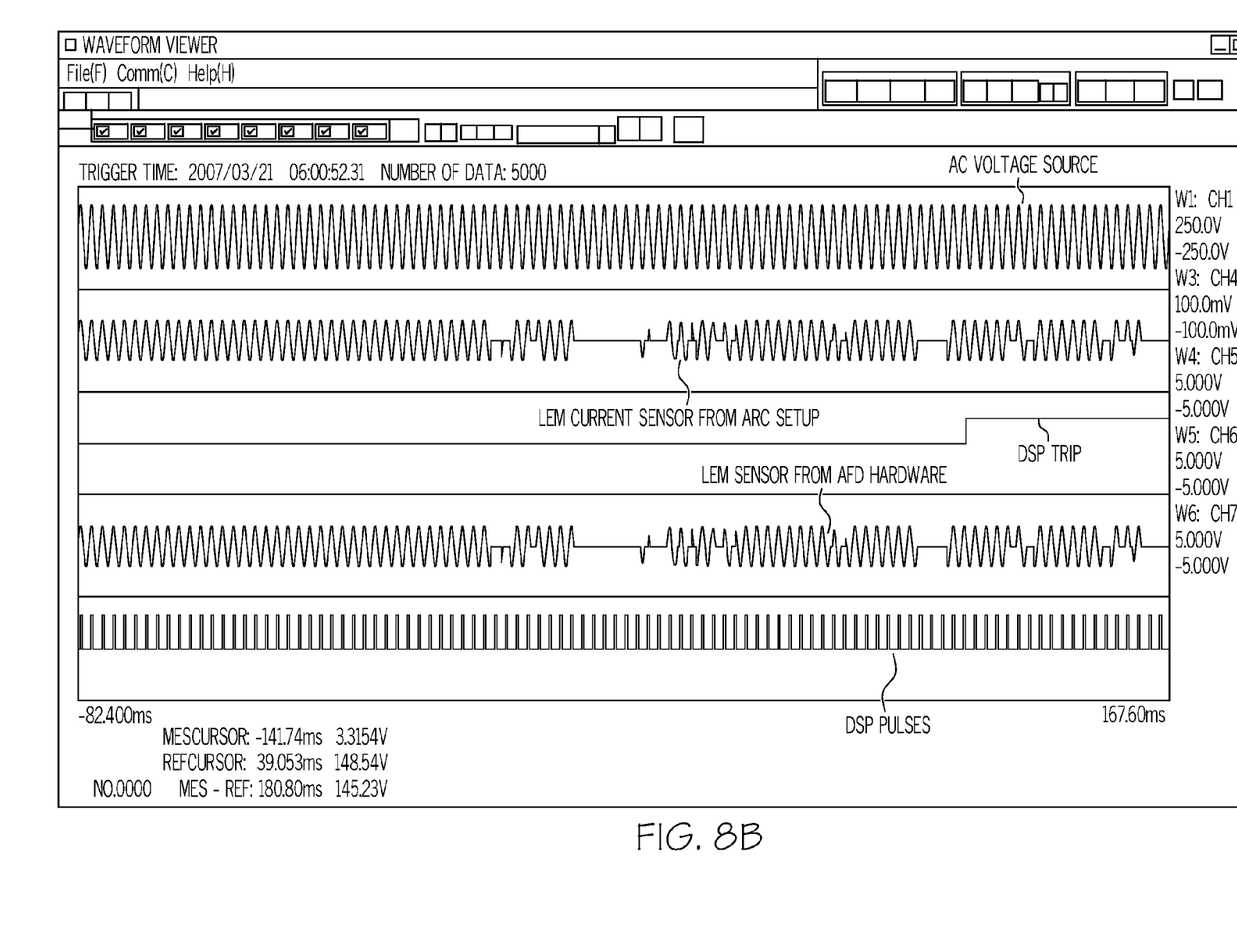
Figure 8C:
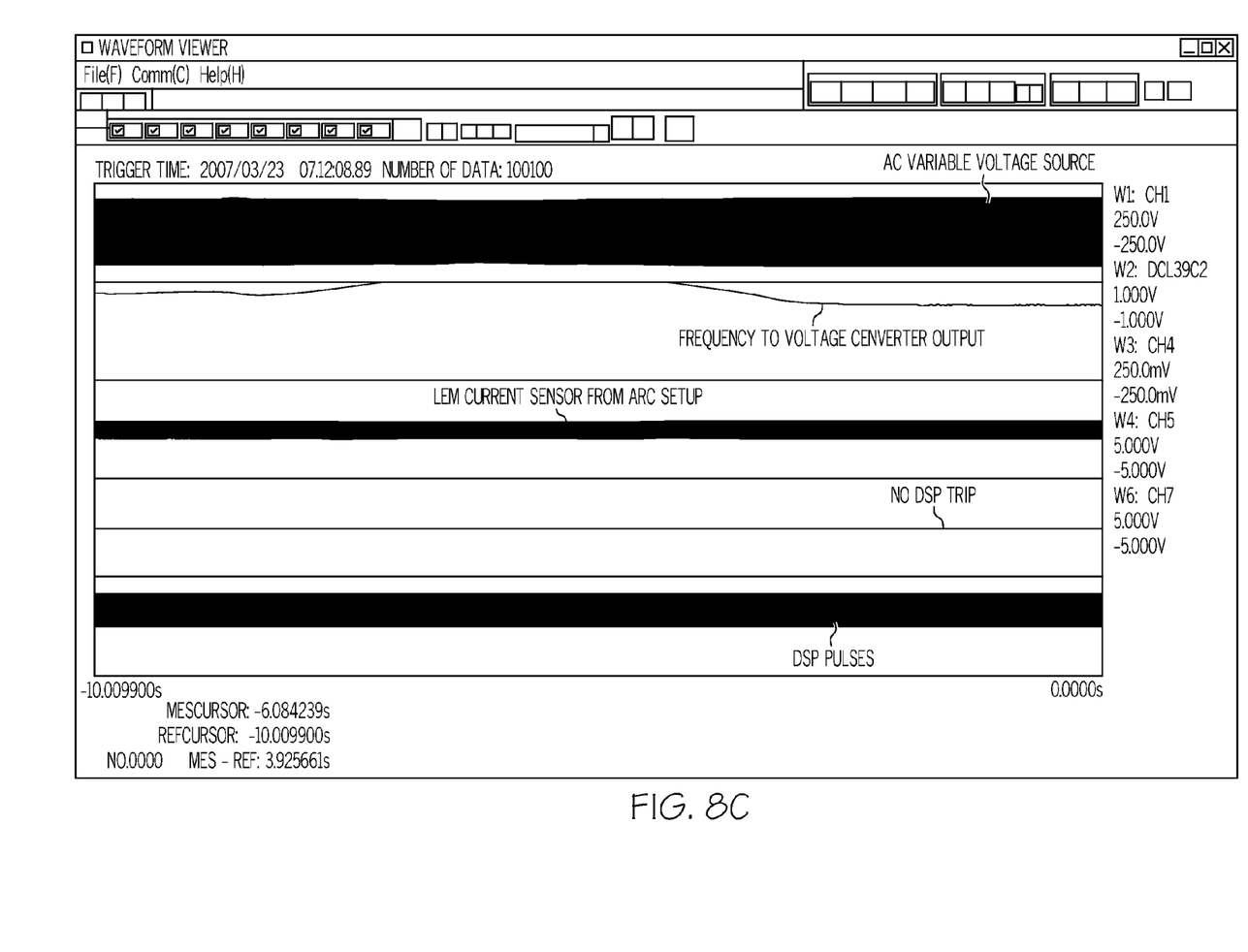
Figure 8D:
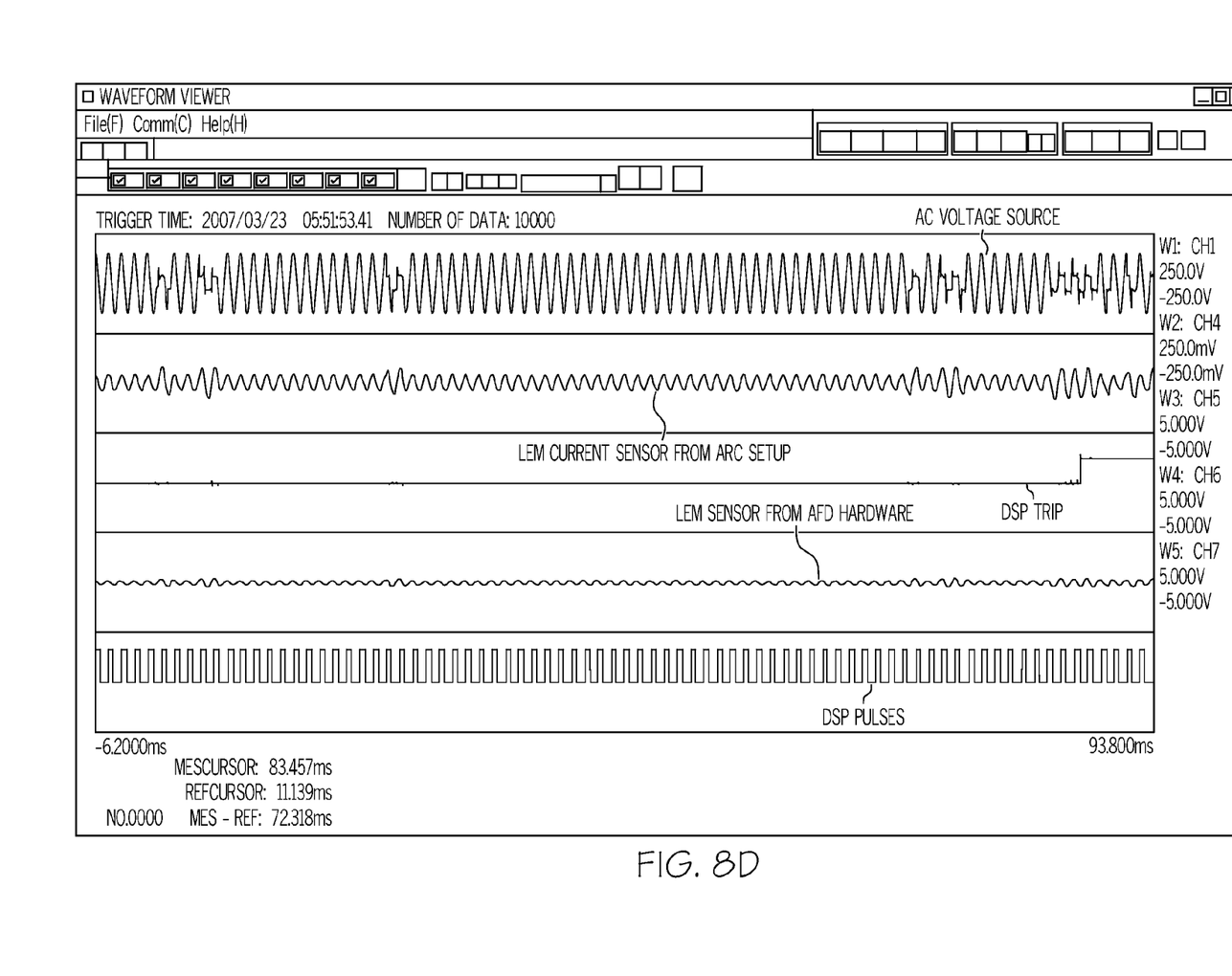
Figure 8E:
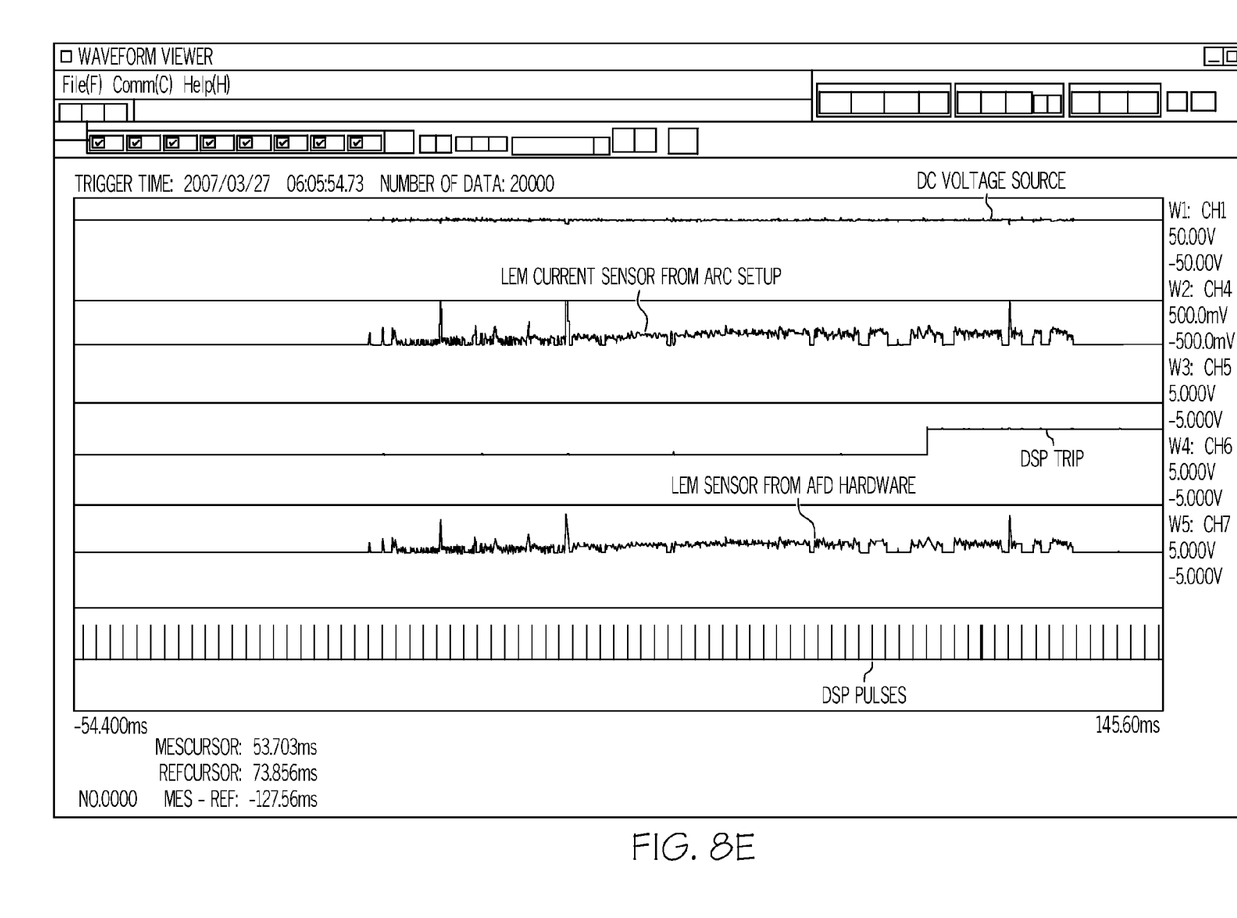
Figure 8F:
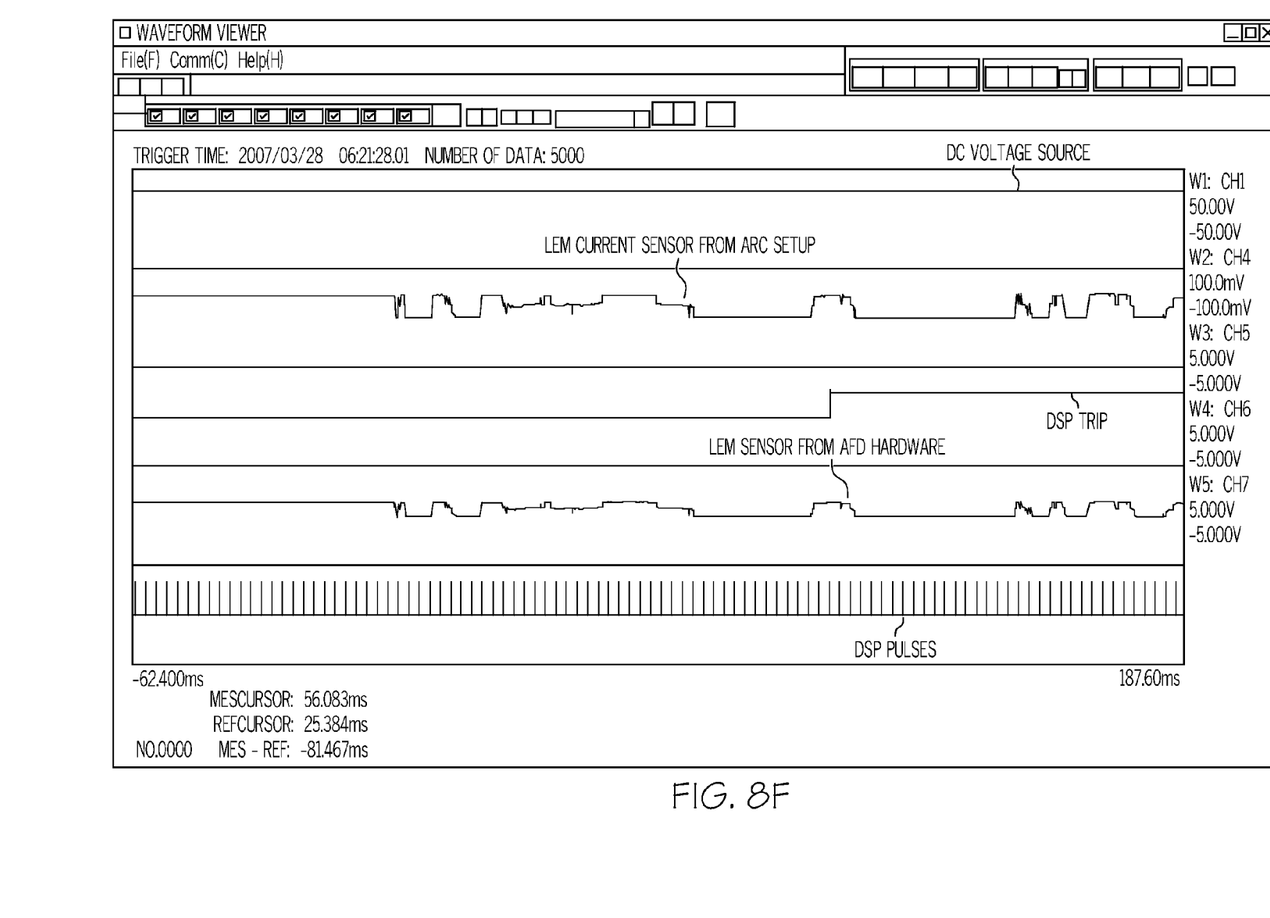

FIG. 7 is a schematic representation of an arc fault detector test setup according to an exemplary embodiment of the present invention. FIGS. 8A-F are schematic representations of exemplary test results according to an exemplary embodiment of the present invention. The test results include AC parallel arc at 400 Hz (FIG. 8A), AC series arc at 400 Hz (FIG. 8B), AC parallel arc at 800 Hz (FIG. 8D), DC parallel arc (FIG. 8E), DC series arc (FIG. 8F), and a variable frequency AC transient test (FIG. 8C). The results show that the setup successfully detected all the arc faults, and gave no nuisance trip in the transient test.

It should be understood, of course, that the foregoing relates to exemplary embodiments of the invention and that modifications may be made without departing from the spirit and scope of the invention as set forth in the following claims.

We claim:

1. A method, comprising:
obtaining a first cycle of a fundamental component of a sampled current with a running discrete Fourier series (RDFS) processor;
obtaining a second cycle of the fundamental component of the sampled current with the RDFS processor;
comparing the first cycle of the fundamental component of the sampled current and the second cycle of the fundamental component of the sampled current to determine if a difference of the first cycle and the second cycle currents is greater than a threshold amount;
determining if an overload condition exists based on an i²t calculation; and
determining if an arc fault is detected based on either the difference of the first cycle and the second cycle currents of the first and second cycles or an overload condition based on the i²t calculation.

2. The method of claim 1, further comprising repeating the method to obtain a sum of occurrences of differences greater than the threshold amount.

3. The method of claim 1, wherein the RDFS processor derives the fundamental component of the sampled current according to:

$$a_0 = \frac{1}{2(N-1)}\left[\left(2\sum_{i=1}^{N} f_i\right) - f_1 - f_N\right]$$

$$a_n = \frac{1}{N-1}\left[2\sum_{i=1}^{N} f_{ai} - f_{a1} - f_{aN}\right]$$

$$b_n = \frac{1}{N-1}\left[2\sum_{i=1}^{N} f_{bi} - f_{b1} - f_{bN}\right]$$

wherein $a_0$, $a_n$ and $b_n$ are variables in an arbitrary waveform f (ωt) that is described by the Fourier series:

$$f(t) = a_0 + \sum_{n=1}^{\infty} a_n \sin(n\omega t) + \sum_{n=1}^{\infty} b_n \cos(n\omega t).$$

4. The method of claim 1 further comprising:
determining if a normalized value of the sampled current is greater or less than a preselected value;
establishing a first threshold setting if the normalized value of the sampled current is greater than the preselected value;
establishing a second threshold setting if the normalized value of the sampled current is less than the preselected value;
comparing the first cycle of the fundamental component of the sampled current and the second cycle of the fundamental component of the sampled current to determine if a difference of the first cycle and the second cycle current is greater than a threshold amount with a first monitor and a first detector if the normalized value is greater than the preselected value; and
comparing the first cycle of the fundamental component of the sampled current and the second cycle of the fundamental component of the sampled current to determine if a difference of the first cycle and the second cycle current is greater than a threshold amount with a second monitor and a second detector if the normalized value is less than the preselected value.

* * * * *